(12) United States Patent
Pivonka

(10) Patent No.: US 9,103,688 B2
(45) Date of Patent: Aug. 11, 2015

(54) ADAPTING VEHICLE PERSONALITY USING ANALYZED DRIVER PERFORMANCE METRICS

(71) Applicant: Continental Automotive Systems, Inc., Auburn Hills, MI (US)

(72) Inventor: David B Pivonka, Winfield, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 57 days.

(21) Appl. No.: 13/972,432

(22) Filed: Aug. 21, 2013

(65) Prior Publication Data

US 2015/0057931 A1 Feb. 26, 2015

(51) Int. Cl.
*G01C 21/34* (2006.01)
*G08G 1/123* (2006.01)

(52) U.S. Cl.
CPC .................................. *G01C 21/3484* (2013.01)

(58) Field of Classification Search
CPC ..................... B60R 2021/01525; B60R 25/25; B60R 16/037; B60R 1/00; G06F 19/3468; G06F 17/00; G06F 1/00; G06F 17/30; G01C 21/3697; G01C 21/34; G01C 21/00; G01C 21/12; G01C 21/32; G01C 21/3446; G01C 21/20; G01C 21/26; G01C 19/56; G01C 19/567; B60W 2550/402; B60W 20/00; B60W 40/10; B60W 50/14
USPC ........... 701/31, 1, 45, 532, 117, 400, 533, 99, 701/411, 36, 118, 119, 302, 423
See application file for complete search history.

(56) References Cited

U.S. PATENT DOCUMENTS

| | | | | |
|---|---|---|---|---|
| 5,689,241 | A * | 11/1997 | Clarke et al. | 340/575 |
| 6,724,920 | B1 * | 4/2004 | Berenz et al. | 382/118 |
| 6,996,469 | B2 * | 2/2006 | Lau et al. | 701/418 |
| 7,027,621 | B1 * | 4/2006 | Prokoski | 382/118 |

(Continued)

FOREIGN PATENT DOCUMENTS

| | | |
|---|---|---|
| EP | 1995559 A1 | 11/2008 |
| WO | 2011/066468 A1 | 6/2011 |

OTHER PUBLICATIONS

International Search Report and Written Opinion dated Dec. 22, 2014, from corresponding International Patent Application No. PCT/US2014/046018.

(Continued)

*Primary Examiner* — Calvin Cheung
*Assistant Examiner* — Luis A Martinez Borrero

(57) ABSTRACT

A vehicle's driving personality is adapted to a driver by determining a driver's ability to operate the vehicle by monitoring the driver's operation. The driver's operation, such as vehicle speed, lane usage, and braking, is compared to known characteristics of the road segment on which the vehicle is being driven. The driver's competency is evaluated by comparing how the driver operates a vehicle on a segment of roadway to how the vehicle could be operated and stay within limits imposed by law. A driver's ability to operate the vehicle can also be obtained from sensors that monitor a driver's heart rate, respiration rate, eye movement, and other health-indicating autonomic responses. After the driver's capabilities are determined, navigation instructions provided to the driver thereafter are modified to route the driver over roads that are either preferred or appropriate for the driver's physical abilities.

12 Claims, 2 Drawing Sheets

(56) References Cited

U.S. PATENT DOCUMENTS

| | | | | |
|---|---|---|---|---|
| 7,423,540 | B2* | 9/2008 | Kisacanin | 340/576 |
| 7,769,499 | B2 | 8/2010 | McQuade et al. | |
| 8,009,051 | B2* | 8/2011 | Omi | 340/575 |
| 8,040,247 | B2* | 10/2011 | Gunaratne | 340/575 |
| 8,062,220 | B2* | 11/2011 | Kurtz et al. | 600/301 |
| 8,063,786 | B2* | 11/2011 | Manotas, Jr. | 340/576 |
| 8,108,083 | B2* | 1/2012 | Kameyama | 701/1 |
| 8,140,358 | B1* | 3/2012 | Ling et al. | 705/4 |
| 8,253,551 | B2* | 8/2012 | Tsai | 340/439 |
| 8,311,284 | B2* | 11/2012 | Johns | 382/104 |
| 8,847,771 | B2* | 9/2014 | Gunaratne et al. | 340/576 |
| 8,892,310 | B1* | 11/2014 | Palmer et al. | 701/41 |
| 2006/0001531 | A1* | 1/2006 | Waterman | 340/438 |
| 2008/0120025 | A1* | 5/2008 | Naitou et al. | 701/207 |
| 2008/0212828 | A1* | 9/2008 | Ishida et al. | 382/100 |
| 2008/0289895 | A1* | 11/2008 | Goi | 180/272 |
| 2009/0034796 | A1* | 2/2009 | Johns | 382/103 |
| 2011/0118965 | A1* | 5/2011 | Aben et al. | 701/117 |
| 2011/0210867 | A1* | 9/2011 | Benedikt | 340/905 |
| 2012/0078509 | A1* | 3/2012 | Choi | 701/423 |
| 2013/0054090 | A1* | 2/2013 | Shin et al. | 701/36 |
| 2013/0345977 | A1* | 12/2013 | Shimizu et al. | 701/533 |
| 2014/0012494 | A1* | 1/2014 | Cudak et al. | 701/412 |

OTHER PUBLICATIONS

I-Cheng Lin, et al., "Developing Adaptive Driving Route Guidance Systems Based on Fuzzy Neural Network", IEEE International Conference on Systems, Man and Cybernetics, 2009, SMC 2009, Oct. 11-14, 2009, San Antonio, TX, pp. 4293-4298, ISSN: 1062-922X, E-ISBN: 978-1-4244-2794-9, Print ISBN: 978-1-4244-2793-2, IEEE, USA.

* cited by examiner

ADAPTING VEHICLE PERSONALITY USING ANALYZED DRIVER PERFORMANCE METRICS

BACKGROUND

Prior art navigation systems are able to provide audible and visual instructions by which a driver can navigate from a starting point to an ending point. The driving instructions provided by prior art navigation systems are either shortest distance, shortest time or, alternate routes around a traffic tie up or particular route. Prior art navigation systems do not consider an individual's measured driving ability nor do they consider whether a driver might have physical or age-related driving limitations or experiential limitations. A method and apparatus for adapting a vehicle's personality, or driving characteristics, which provides navigation instructions that are tailored or adjusted using analyzed driver performance metrics would be an improvement over the prior art.

BRIEF SUMMARY

In accordance with embodiments of the invention, a vehicle's driving personality is adapted to a driver by determining a driver's ability to operate the vehicle by monitoring the driver's operation. The driver's operation, such as vehicle speed, lane usage, and braking, is compared to known characteristics of the road segment on which the vehicle is being driven. The driver's competency is evaluated by comparing how the driver operates a vehicle on a segment of roadway to how the vehicle could be operated and stay within limits imposed by law. A driver's ability to operate the vehicle can also be obtained from sensors that monitor a driver's heart rate, respiration rate, eye movement, and other health-indicating autonomic responses. After the driver's capabilities are determined, navigation instructions provided to the driver thereafter are modified to route the driver over roads that are either preferred or appropriate for the driver's physical abilities.

DETAILED DESCRIPTION

The method and apparatus disclosed herein adapt a vehicle's driving "personality" using driver performance metrics, which are vehicle operation data collected from vehicle-located sensors or entered beforehand into the vehicle driver profile. The sensors monitor how a driver operates a vehicle over a road segment and compares the driver's operation to known characteristics of the road segment. Known road segment characteristics include posted speed limits, number of lanes, traffic congestion, road conditions, or density during different times of the day. By comparing how a driver actually operates a vehicle to how the vehicle could be operated, a determination or estimate can be made as to how well the driver is able to operate the vehicle on various types of roadways.

After the driver's capabilities are determined, a navigation system may be optimized repeatedly to provide route guidance that will direct the vehicle over road segments the characteristics of which are consistent with the driver's determined capabilities.

Figure 1:
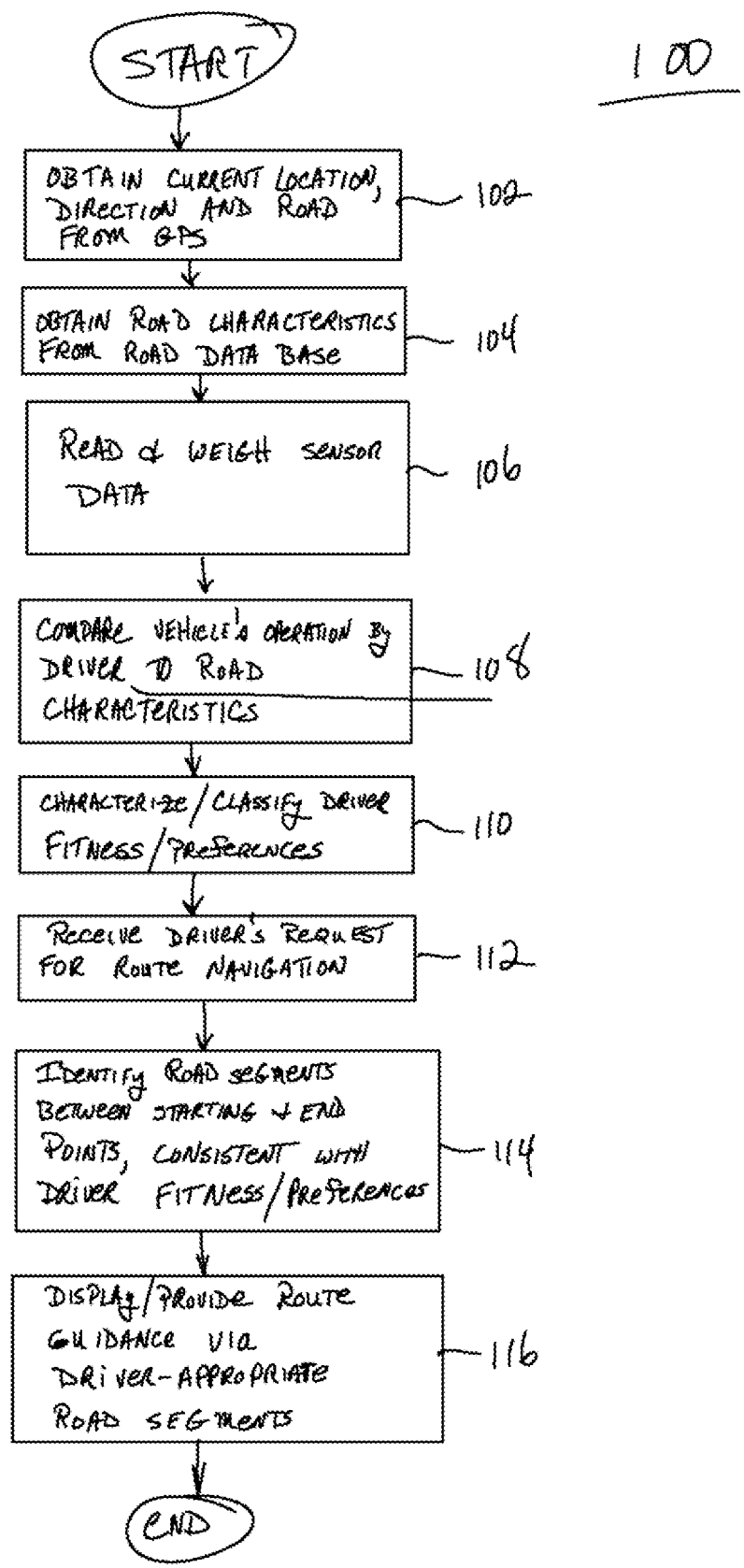
FIG. 1 depicts steps of a method for adapting a vehicle personality using analyzed driver performance metrics.

FIG. 1 depicts steps of a method 100 for adapting a vehicle's driving personality using analyzed driver performance metrics. At step 102, a current location, direction of travel, and identification of the road or street on which a vehicle is located is obtained from an on-board global positioning system or GPS device. After the road, direction, and location are determined in step 102, various characteristics of the road are obtained from a road database in step 104. Relevant examples of road characteristics include a speed limit, number of lanes, whether the road is a limited access road, such as an interstate highway, nearby cross streets, the existence of merging lanes, turning lanes, emergency lanes, and traffic congestion characteristics. Road characteristics provide information as to how a vehicle should be safely operated as required by law.

At step 106, one or more vehicle sensors, i.e., sensors on the vehicle, are "read" by an on-board computer in order to obtain real time data on how the driver is operating the vehicle on the particular road. In an embodiment, a driver's age, skill, and health parameters can be input via a dashboard-mounted display panel or obtained from the driver's profile, which can be obtained from a driver's license number, a state's database or authorized drivers or manual profile selection, key code entry, or key FOB identification.

The sensors read at step 106 include by way of example and not limitation, precipitation sensors, ambient light sensors, exterior temperature sensors, speed sensors, braking/ABS actuation sensors, lane departure, accelerometers, interior and exterior lights, horn, turn signal operation sensors, emergency flasher's sensor, respiration and heart rate sensors, a global positioning system (GPS) navigation system, interior temperature sensors, fan speed sensors, radio or audio system volume level sensors, seat position sensors, radio channel or station sensors, window position sensors, window operation sensors and door lock sensors can provide information indicative of a driver's ability to competently operate a vehicle. For example, when a vehicle is driven on a lightly-travelled, limited-access interstate highway in warm, clear weather, the vehicle's speed, lane usage and lane changes and braking usage indicate and thus correspond to a driver's ability to operate the vehicle, at least over a similar road. On the other hand, driving a vehicle on a congested, multi-lane urban thoroughfare during rush hour, and drifting across lanes without using turn signals, at speeds well below the posted limit and braking abruptly at intersecting cross streets, suggests that the driver is unable to operate the vehicle safely.

It will be appreciated that data obtained from different sensors will have different levels of importance. In other words, in determining a driver's ability to operate a vehicle, data from some sensors is more informative than data from other sensors. In determining a driver's ability to operate a vehicle, data from some sensors is therefore "weighted" more heavily than data from other sensors. By way of example, a vehicle operation speed that is consistently well below a posted speed limit is more indicative of a challenged driver than is infrequent or no turn signal usage. Repeatedly braking abruptly at cross streets is more indicative of a challenged driver than are sudden accelerations. Step 106 thus includes weighting the sensor data.

Figure 2:
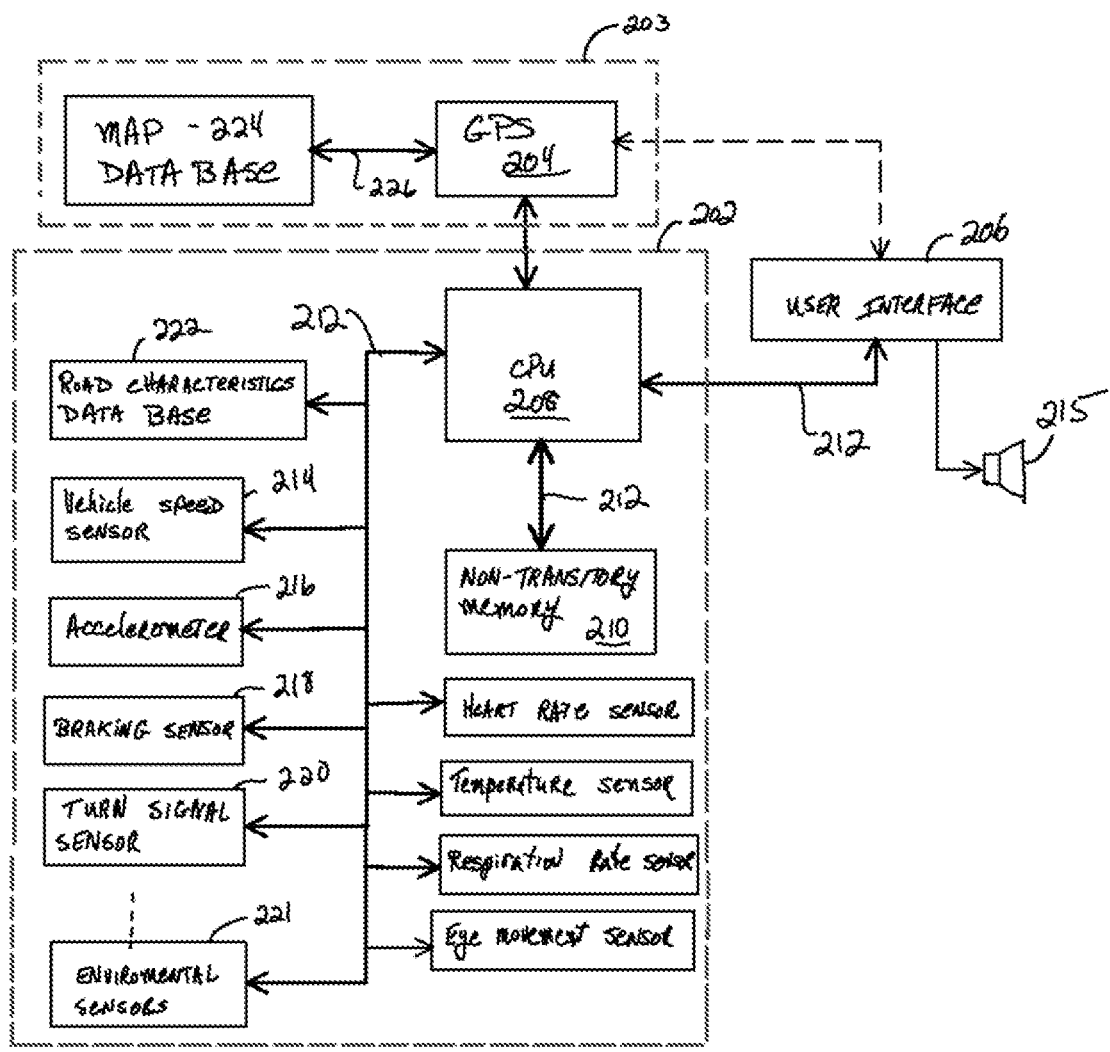
FIG. 2 is a block diagram of an apparatus usable for adapting a vehicle's personality to a driver's driving capabilities.

A CPU, such as the CPU 208 shown in FIG. 2, collects sensor data in real time and integrates the data in real time by using a weighting algorithm based on occupant and collateral safety assessment (e.g., speeding in school zone would have higher rating than a radio audio level). This information is summarized into several weighting scores defining a driver's ability to operate a vehicle in driving situations. Different driving situations include, but are not limited to, high speed ability, high congestion ability, slippery conditions, and narrow roads.

At step 108, the vehicle's operation, as determined by vehicle sensors, is compared to particular characteristics of a roadway on which the vehicle is being driven when the sensors are being read. A comparison of the vehicle's operation to the road's characteristics can indicate whether the driver is competent to negotiate the particular roadway or should be on a roadway more suitable to the driver's skill level or physical capabilities.

The comparison of the vehicle's operation to the road characteristics in step 108 enables the driver to be classified or characterized in step 110 regarding his or her fitness, experience, or preferences for a particular roadway. By way of example, at step 110 a driver will be characterized or classified as relatively inexperienced or partially impaired for a particular roadway or type of roadway that sensor data indicates to be inappropriate for the driver.

After the driver's performance metrics are obtained and evaluated in steps 102-110, subsequent requests for route navigation, as happens in step 112, is followed by the navigation system's identification of road segments between a starting and end point that are consistent with the driver's fitness/preferences as determined in step 110. In step 114, the driver's request for route navigation that is received in step 112 is answered by providing a route to the driver comprising road segments having characteristics that are consistent with the driver's capabilities and therefore provided responsive to the determined driving capabilities of the driver.

Those of ordinary skill in the art will recognize that step 114 includes identifying road segments that are contiguous with each other. In an embodiment, the navigation instructions provided to a driver thus route the driver over successive roads the characteristics of which match or correlate to the driver's capabilities and/or driving preferences as determined by data obtained from vehicle sensors and compared to road characteristics.

In step 116, route guidance is provided to the driver using an appropriate user interface. Examples of appropriate interfaces are display panels as well as enunciated or audible instructions.

FIG. 2 is a block diagram of an apparatus for providing or adapting vehicle personality to a driver's capabilities. In FIG. 2, the apparatus 200 comprises a driving capability determiner 202 and a navigation system 203. The navigation system 203 comprises a navigation system, such as a GPS system 204 and a map data base 224. Navigation systems are well known and a description of them is omitted for brevity. A user interface 206 may be coupled to the driving capability determiner 202 but can optionally be coupled directly to the GPS 204 as well as a loud speaker 215.

The driving capability determiner 202 comprises a computer or CPU 208 that is coupled to a conventional non-transitory memory device or devices 210 through a conventional address/data/control bus 212. The memory device 210 stores driver information, such as a driver's age, motor skill limitations or other physical conditions that might affect the driver's ability to operate a motor vehicle.

The bus 212 also couples the computer/CPU 208 to one or more vehicle-located environmental sensors and driver health sensors, which monitor a driver's autonomic nervous system. In FIG. 2, the computer/CPU 208 is coupled to a vehicle speed sensor 214, an accelerometer 216, a braking sensor 218, and a turn signal sensor 220 all via the bus 212. Environmental sensors 221 include ambient temperature sensors, precipitation sensors, light sensors, interior temperature sensors, vehicle heat and air conditioning sensors, window and seat sensors and the like, all of which are known in the art and omitted for brevity.

Sensors that monitor a driver's autonomic nervous system activity are considered herein to be "driver health sensors." Such sensors include, but are not limited to, a heart rate sensor 230, a temperature sensor 232, a respiration rate sensor 234, and an eye movement sensor 236. Data from the driver health sensors enable the CPU 208 and the computer program instructions that the CPU 208 executes to determine a driver's alertness, agitation, and/or comfort level while operating the vehicle under various environmental conditions.

The CPU 208, which is also considered herein to be a computer, is also coupled to a road characteristic database 222 which contains information on particular roadways, such information including posted speed limits, the number of lanes, the direction the roadway runs, access points, cross streets, stop signs, stop lights, and so forth. The navigation system or GPS 204 is coupled to a map database 224 via a bus 226 that extends between the GPS 204 and the map database 224. In an embodiment the map database 224 and the bus 226 by which it is connected to the GPS 204 are all one and the same.

In an embodiment, the non-transitory memory device 210 is provided with program instructions which are executable by the CPU 208. Those instructions are selected and configured such that when they are executed by the CPU 208 they cause the CPU 208 to read signals from the various sensors 214-220 and 230-236 and determine from the data obtained from those sensors a driver's physical ability to drive the vehicle along a roadway the characteristics of which are obtained from the road database 222. Stored program instructions cause the CPU 208 to weight sensor data by addition, subtraction, multiplication, or division of sensor signals and the data such signals can represent. Other instructions in the non-transitory memory 210 cause the CPU 208 to store representations or evaluations of the driver's ability in the same memory device or in other memory devices not shown.

Additional instructions stored in the non-transitory memory cause the CPU 208 to receive a request for driving instructions obtained from the user interface 206 via the same bus 212. When those driving instructions are requested via the user interface 206, program instructions stored in the non-transitory memory 210 cause the CPU to interrogate the GPS 204 to provide driver-appropriate driving instructions responsive to the request that was received from the user interface 206.

Acting responsive to instructions stored in the non-transitory memory, the CPU 208 provides driver-appropriate navigation instructions to the driver via the user interface 206. The particular instructions provided to the driver are selected to route the driver over appropriate or preferred roadway segments responsive to the stored determination of a driver's physical ability to negotiate the roadways that the vehicle is operating on and to route the vehicle from a starting location to a destination.

In a preferred embodiment the user interface 206 is a touch-sensitive display device. Such devices are well known and include the ability to receive tactile inputs, generate information-bearing signals that indicate where a touch input was received on the display device and to display images. In another embodiment, an audio speaker 215 or other acoustic device is connected to the user interface 206 and provides enunciations of driving directions by which a driver is instructed to navigate the vehicle over driver-appropriate roadway.

The foregoing description is for purposes of illustration only. The true scope of the invention is set forth in the following claims.

The invention claimed is:

1. A method of configuring a vehicle driving personality comprising:

determining driving capabilities of a vehicle's driver by comparing characteristics of how the vehicle is operated by the driver over a first road segment, to known characteristics of the first road segment, the determination of the driving capabilities being obtained from at least one of: (1) a plurality of driver health sensors, which are operatively coupled to a computer that monitors signals output from the plurality of driver health sensors, the driver health sensors being configured to detect autonomic nervous system activity of the driver that indicate at least one of a driver's alertness, agitation and comfort level while operating the vehicle over the first road segment, and (2) at least one of: determining a speed at which the vehicle was operated by the driver over the first road segment and comparing the speed at which the vehicle was operated over the first road segment to a known speed limit for the first road segment; determining different road lanes in which the vehicle was driven over the first road segment and comparing the lanes that were used by the driver over the first road segment to the number of lanes on the first road segment; determining distances that the vehicle was driven in different road lanes over the first road segment; determining the vehicle's brake pedal usage over the first road segment and comparing the brake pedal usage to a known traffic congestion for the first road segment; determining lane changes made by the driver over the first road segment and determining turn signal indicator operation for said lane changes; determining a direction and a rate at which lane changes are made by the driver over the first road segment; and determining the time of day at which the vehicle was driven over the first road segment to known traffic patterns for the first road segment, at different times of day, and providing driving directions to the driver, which direct the driver to travel over a second road segment having known characteristics, the second road segment being selected from a plurality of different road segments extending between a starting location and a destination, the second road segment being selected responsive to the determined driving capabilities of the driver, the driving directions provided to the driver being obtained from a computer coupled to a global positioning system and provided through a user interface inside the vehicle.

2. The method claim 1, wherein the step of determining driving capabilities of a vehicle's driver comprises:

determining a driver's capabilities from at least one of: a heart rate sensor, a respiration sensor, the driver's temperature and an eye movement sensor.

3. The method of claim 2, wherein the step of determining driving capabilities further comprises determining and weighting a driver's determined ability to:

operate the vehicle at a posted speed limit over the first road segment;

operate the vehicle in different lanes over the first road segment;

indicate lane changes over the first road segment;

operate the vehicle in congested traffic over the first road segment; and apply vehicle braking responsive to traffic conditions over the first road segment.

4. The method of claim 1, wherein the step of providing a second road segment comprises the step of providing visual and audible navigation directions.

5. The method of claim 1, wherein the step of providing a second road segment comprises:

determining a starting point and an ending point for a driver-specified desired destination;

determining a plurality of different roads that extend between the starting point and ending point, the different roads having different characteristics; and providing to the driver, a second road segment having characteristics corresponding the driver's capability to operate the vehicle.

6. The method of claim 5, wherein step of providing a second road segment having a characteristic corresponding to a determined driver capability comprises at least one of:

providing a road segment according to a driver-appropriate posted speed limit;

providing a road segment according to a driver-appropriate traffic congestion level;

providing a road segment according to a driver-appropriate number of lanes on the road segment; and providing a road segment according to a driver-appropriate travel time.

7. A method of configuring a vehicle driving personality to a driver's capabilities, the method comprising:

determining driving capabilities of a vehicle's driver by monitoring at a computer, signals from at least one of: an environmental sensor and a driver health sensor;

determining a speed at which the vehicle was operated by a driver over a road segment and comparing the speed at which the vehicle was operated over the road segment to a posted speed limit for the road segment;

determining road lanes in which the vehicle was driven over a road segment and comparing the lanes that were used by the driver over the road segment to the number of lanes on the road segment;

determining times and distances that the vehicle was driven in different road lanes over a road segment;

determining the vehicle's brake pedal usage over the road segment and comparing the brake pedal usage to a known traffic congestion for the road segment;

determining when lane changes were made by the driver over a road segment and determining whether turn signals were correctly used by the driver for a plurality of lane changes;

determining a direction and a rate at which lane changes are made by the driver;

determining the time of day at which the vehicle was driven over a road segment and correlating the time of day to known traffic patterns for the road segment, at different times of day;

receiving the driver's request for a route that extends between first and second end points;

selecting contiguous road segments between the first and second end points responsive to determined driving capabilities of the driver; and providing route guidance to a driver through a user interface located inside the vehicle, the route guidance being obtained from a computer coupled to a global positioning system and routing the driver over a route that extends between the first and second end points, the route having characteristics that correlate to the drivers determined capabilities.

8. An apparatus for configuring a vehicle driving personality to a driver's driving capabilities, the apparatus comprising:

a driving capability determiner comprising a driver health sensor in the vehicle and environmental sensors in the vehicle, the driver health sensor and environmental sensors being coupled to a computer, also in the vehicle, the driving capability determiner being configured to determine driving capabilities of a vehicle's driver over a road segment by monitoring environmental conditions inside the vehicle, monitoring a driver's autonomic nervous system activity via the driver health sensor and by comparing characteristics of how the vehicle is operated by the driver over a first road segment, to known characteristics of the first road segment;

a navigation system coupled to the driving capability determiner and configured to provide driving directions to the driver, driving directions being selected to route the driver over road segments responsive to the determined driving capabilities of the driver, the driving directions being provided from a user interface located inside the vehicle.

9. The apparatus of claim 8, wherein the driver health sensor comprises at least one of:
   a heart rate sensor;
   a respiration sensor;
   a temperature sensor; and
   an eye movement sensor.

10. The apparatus of claim 8, further comprising a user interface coupled to the computer, the user interface configured to receive input signals from a driver and to provide driving directions to a driver responsive to an input from the driver and a determination of the driver's ability to operate the vehicle.

11. The apparatus of claim 10, wherein the user interface comprises a touch-sensitive display device configured to receive tactile inputs and display images.

12. The apparatus of claim 10, wherein the user interface comprises an audio speaker.

* * * * *